United States Patent [19]
Gutjahr

[11] 3,866,812
[45] Feb. 18, 1975

[54] MACHINE FOR AUTOMATIC STRINGING OR COLLARING OF PACKAGES WITH PLASTIC TAPE

[75] Inventor: Paul Gutjahr, Zurich, Switzerland

[73] Assignee: Erapa AG, Zumikon, Switzerland

[22] Filed: May 2, 1973

[21] Appl. No.: 356,513

[30] Foreign Application Priority Data
May 19, 1972 Switzerland.................. 7469/72

[52] U.S. Cl................ 226/50, 53/DIG. 2, 100/33, 156/443, 156/468, 156/475, 156/495, 226/178, 226/181, 226/195
[51] Int. Cl...................... B65h 17/22, B65h 23/08
[58] Field of Search.......... 156/212, 443, 468, 475, 156/476, 494, 495, 555; 81/9.1 R; 254/79; 140/93 R, 93 C, 93.2; 53/39, 139.3, 198 A, DIG. 2; 100/29, 32, 33; 226/39, 50, 178, 181, 195

[56] References Cited
UNITED STATES PATENTS
1,965,029  7/1934  Bolza................................. 226/39
3,470,814  10/1969  Tschappu...................... 100/33 PB

*Primary Examiner*—Clifton B. Cosby
*Assistant Examiner*—John E. Kittle
*Attorney, Agent, or Firm*—Richard P. Alberi

[57] ABSTRACT

A machine for automatically stringing or collaring packages with plastic tape, in which a portion of the tape is introduced from a tape storage to a stop in an annular channel surrounding the space for the package to be strung or collared, whereupon the tape portion is kept fixed at its free end, strung around the package by retracting the feed-in end and, after reaching a certain final tension, is also kept fixed at the feed-in end and then severed from the storage tape, after which operations the overlapping tape ends are joined by heat-sealing.

8 Claims, 3 Drawing Figures

MACHINE FOR AUTOMATIC STRINGING OR COLLARING OF PACKAGES WITH PLASTIC TAPE

BACKGROUND OF THE INVENTION

1. Field of the Invention

This invention relates to a machine for automatically stringing or collaring packages with plastic tape, in which a portion of the tape is introduced (from storage tape) up to a stop in an annular channel surrounding the space for the package to be strung or collared, whereupon the tape portion is kept fixed at its free end, strung around the package by retracting the feed-in end and, after reaching a certain final tension, is also kept fixed at the feed-in end and then severed from the storage tape, after which operations the overlapping tape ends are joined by heat-sealing.

2. Description of the Prior Art

In the prior art, drive means for advancing and retracting tape for stringing packages are known. However, such drive means comprise only a single pair of reversible drive pulleys which must bear the three functions of advancing the tape, retracting the tape, and tensioning the tape. Apparatuses utilizing only a single pair of rollers cannot be designed for optimum feed and tensioning capabilities within the limitations imposed upon the pulleys due to its triple function requirements.

Other prior art material feeding devices illustrate the advantages afforded a system utilizing a double set of feed rollers. However, such systems utilize one set of feed rollers only for advancing the tape at one velocity and a second set of feed rollers for advancing the tape at a second velocity.

In spite of the known material driving systems, artisans have failed to solve the problem of producing a tape feeding mechanism which can be designed to optimize three separate functional capabilities, i.e., feeding the tape, retracting the tape, and tensioning the tape.

SUMMARY OF THE INVENTION

The goal of the invention is to provide a low cost drive means for advancing and retracting the tape, which are formed and operated so that, on the one hand, the quality of the tape is not affected by the drive means and, on the other, any type of package is reliably strung or collared without damage to the packaging material and without subsequent reduction of the tension in the tape.

According to the invention, this goal is reached by 1) tape drive means comprising a pair of rollers consisting of a first driving roller and counterpressure roller for advancing the tape, and a second similar pair of rollers for retracting the tape; 2) the driving rollers of the two pairs of rollers are mounted on a seesaw while the two counterpressure rollers are fixed, the one driving roller cooperating in a first position of the seesaw with the corresponding counterpressure roller, and the other driving roller cooperating in a second position of the seesaw with the corresponding counterpressure roller, and 3) two alternatingly energized driving motors having different rates of rotation, with the driving motor having the higher rate of rotation used for both advancing the tape and tensioning the tape upon retraction, and the driving motor having the lower rate of rotation being used for generating the final tension in the tape during the final stage of tape retraction.

BRIEF DESCRIPTION OF THE DRAWING

The drawings show a preferred embodiment of the invention.

DESCRIPTION OF THE PREFERRED EMBODIMENT

Figure 2:
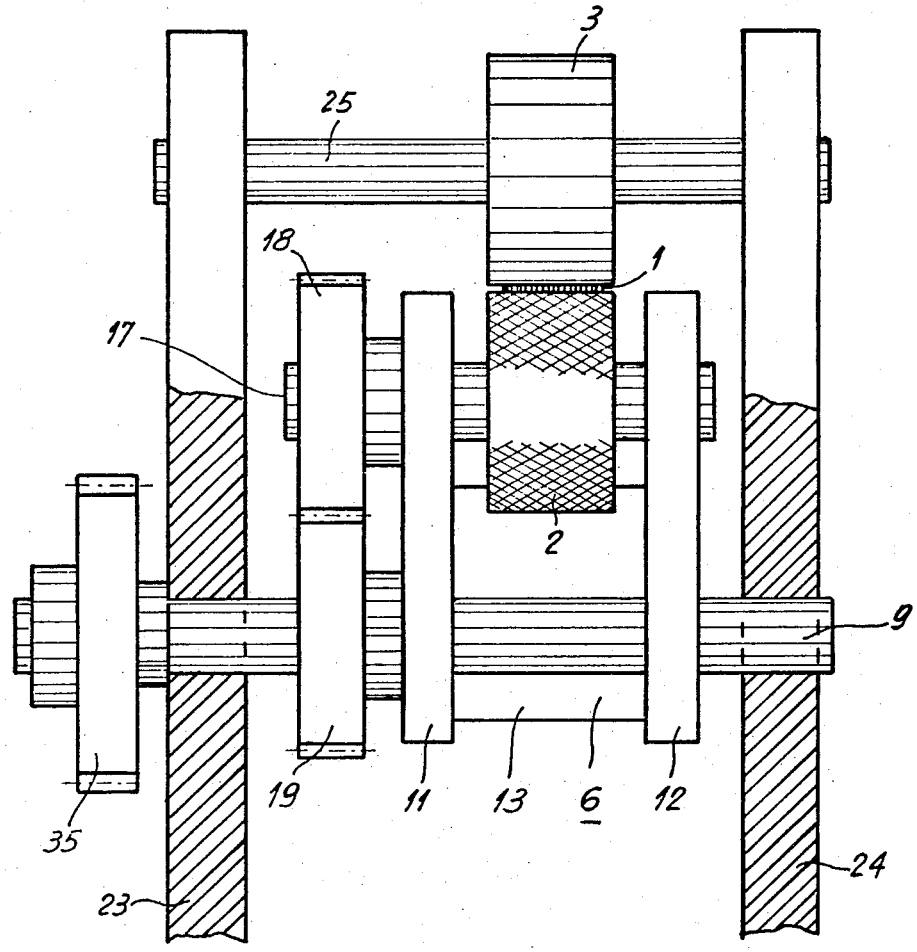
FIG. 2 is a partial cross section of the driving means for advancing the tape, taken along line II—II of FIG. 1.
Figure 3:
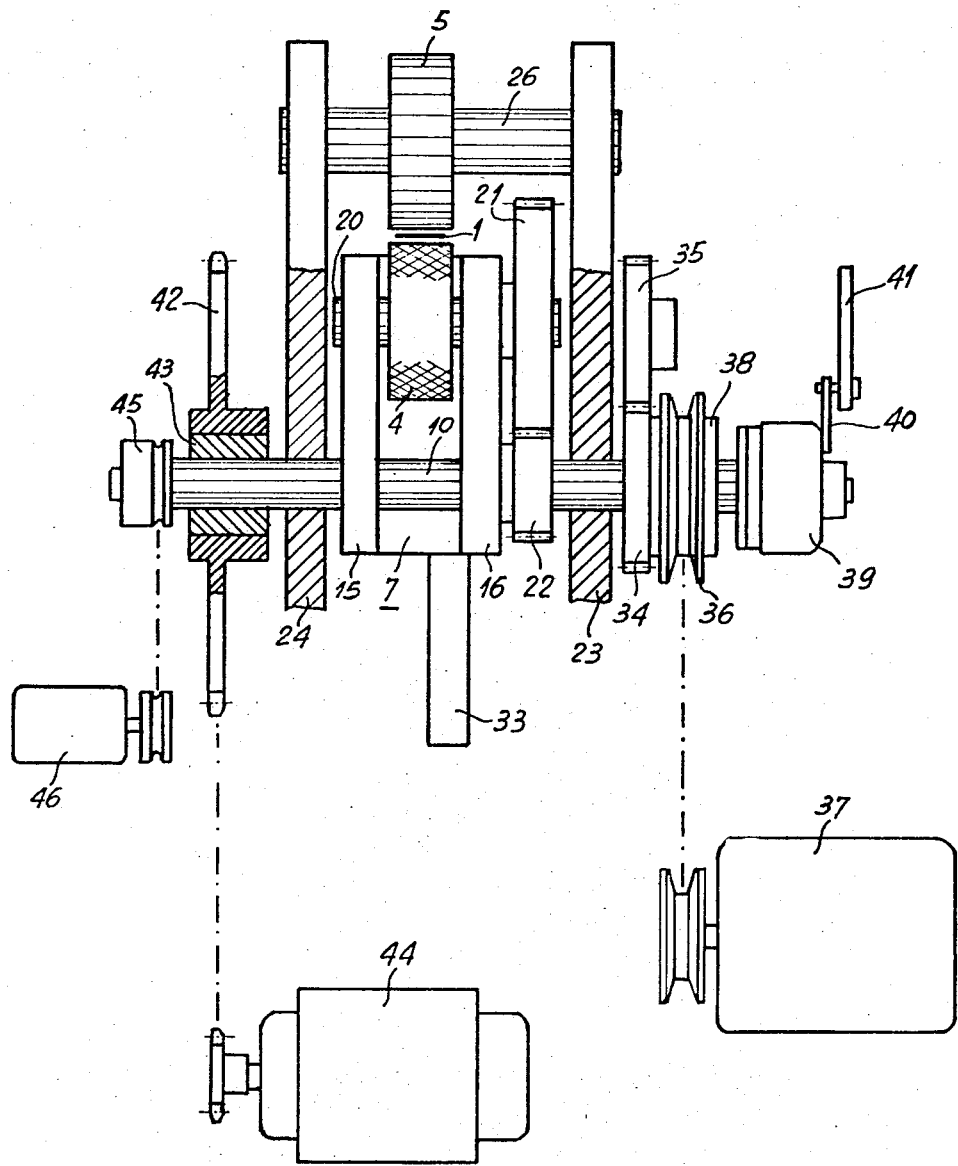
FIG. 3 is a partial cross section of the driving means for retracting the tape, taken along line III—III of FIG. 1.

In order to drive plastic tape 1, which runs through the driving means along a straight path, there are provided two pairs of rollers 2, 3 and 4, 5, each pair comprising a driving roller 2 and 4 and a respective counterpressure roller 3 and 5 mounted in a fixed bearing. Roller pair 2, 3 serves for advancing tape 1, and roller pair 4, 5, for retracting the tape. Driving rollers 2, 4 are mounted on a seesaw having two pivotable frames 6 and 7, which are joined by a guiding member 8 and which support one of driving rollers 2, 4, respectively, mounted at a certain distance from swivel shaft 9 or 10. Pivotable frame 6 comprises two spaced base plates 11, 12 (FIG. 2) which are joined by a bridge member 13. Similarly, pivotable frame 7 (FIG. 3) comprises two base plates 15, 16 which are joined by a bridge member 14. Driving roller 2 (FIG. 2) is mounted on a shaft 17 and coupled to swivel shaft 9 by means of a gear comprising two cog wheels 18, 19. Swivel shaft 9 is at the same time the axis of rotation of pivotable frame 6. Driving roller 4 (FIG. 3) is mounted on a shaft 20 and coupled to swivel shaft 10 by means of a gear comprising two cog wheels 21, 22, with swivel shaft 10 functioning at the same time as the axis of rotation for pivotable frame 7. Two parallel mounting plates 23, 24 are attached to the machine frame (not shown). Swivel shafts 9, 10 and shafts 25, 26 of counterpressure rollers 3, 5 are supported by these mounting plates, with the seesaw 6, 7, 8 and driving rollers 2, 4 mounted between the mounting plates. Mounting plate 23 is not shown in FIG. 1.

Figure 1:
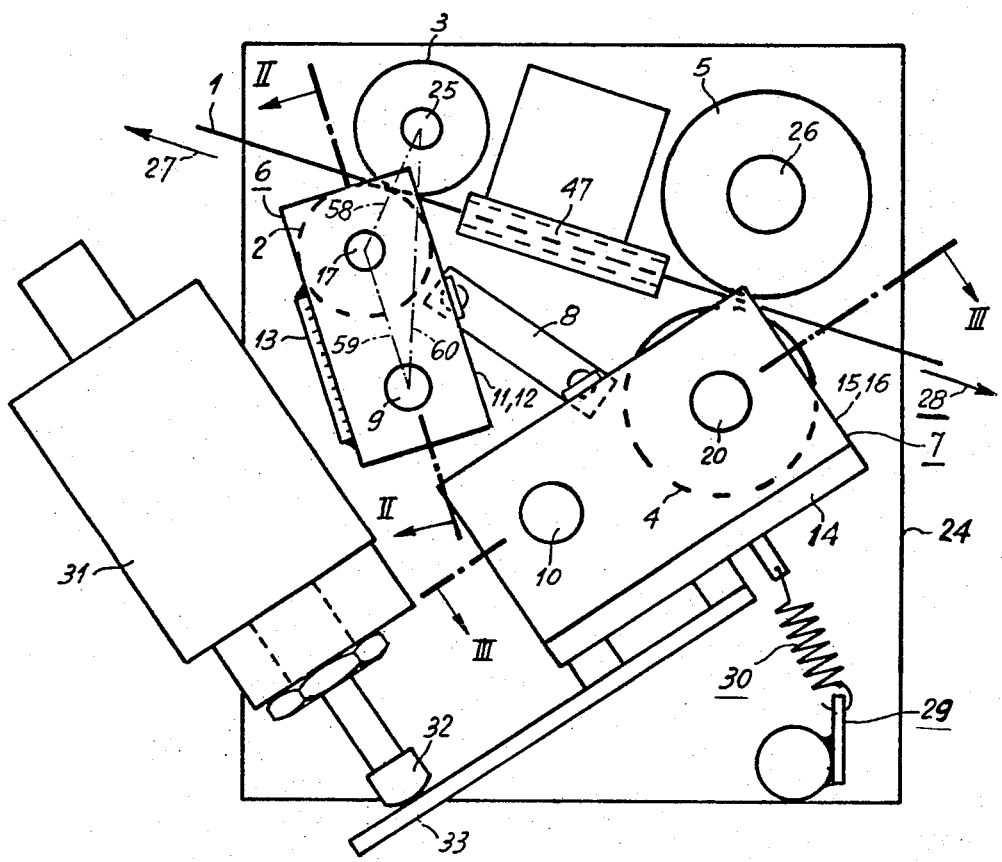
FIG. 1 is a schematic view of the tape-driving means.

In FIG. 1, driving roller 2 for advancing tape 1 in the direction of arrow 27 is shown in the position of operation, in which pivotable frame 6 assumes a position such that line 58 connecting shaft 17 of driving roller 2 with shaft 25 of counterpressure roller 3, and line 59 connecting shaft 17 of driving roller 2 with shaft 9 of pivotable frame 6 each include an acute angle with line 60 connecting swivel shaft 9 with shaft 25 of counterpressure roller 3. The configuration is such that the tensioning force, which is produced by tape 1 engaged by roller pair 2, 3 and which reacts upon driving roller 2 during the operation of the same, tends to rotate pivotable frame 6 by toggle-lever action and, hence, increases the clamping force exerted by roller 2, 3 upon tape 1. Consequently, the pressure exerted upon the tape increases with increasing reaction force exerted by tape 1 upon the advancing drive means, and vice versa. In this fashion, a slip-free force transfer which does not damage the tape can be obtained.

As far as force transfer is concerned, the same effect is obtained when tape 1 is retracted in the direction of arrow 28. This effect is obtained by an appropriate configuration of pivotable frame 7 and shafts 10, 20, and 26 when driving roller 4, which is shown in FIG. 1 in the rest position, is in the position of operation.

Seesaw 6, 7, 8 is kept in the first position shown in FIG. 1 by means of a compression spring 30 which is attached to a fixed lug 29 and acts upon bridge member 14 of pivotable frame 7. In order to switch seesaw 6, 7, 8 into the other (second) position in which driving roller 2 disengages counterpressure roller 3 while driving roller 4 engages counterpressure roller 5, there is provided an electromagnet 31 which acts via a push rod 32 upon lever 33 fastened on pivotable frame 7.

On the one end of swivel shaft 10, which is extended beyond mounting plate 23, there is mounted a freely rotatable cog wheel 34 which engages a cog wheel 35 mounted on the outer end of swivel shaft 9. Cog wheel 34 is connected to a belt pulley 36, which is driven by a driving motor via a V-belt (not shown). In this fashion, with cog wheel 34 turning freely on swivel shaft 10, driving motor 37 is coupled directly to swivel shaft 9 and, hence, to driving roller 2 for advancing the tape. Furthermore, cog wheel 34 is connected via a sleeve 38 attached to belt pulley 36 by a flange to one side of an electromagnetic clutch 39 with a torque limiter, the other side of the clutch being fixedly mounted on the outer end of swivel shaft 10. The stator of the electromagnetic clutch is attached to the fixed portion 41 of the machine by means of a lug-like member 40. Hence, when clutch 39 is in the depressed state, swivel shaft 10 is coupled to driving motor 37.

On the other end of swivel shaft 10, which is extended beyond mounting plate 24, there is provided a chain sprocket 42 with a one-way clutch 43 (overrunning clutch, free-wheel clutch). The chain sprocket is driven via a chain (not shown) by means of a driving motor 44.

Driving motor 37, which is used to advance the tape and, during retracting of the tape, to tension the tape, is a so-called stop motor having a relatively high nominal rate of rotation. Driving motor 44, which in the final stage of tape retraction produces the final tape tension, is designed for a relatively low nominal rate of rotation but for a relatively high nominal torque.

In addition to chain sprocket 42, the outer end of swivel shaft 10 supports a belt pulley 45 which is connected to a tachometer in the form of a small tacho-alternator 46 by means of a belt (not shown in detail). Tacho-alternator 46 is effective during the tensioning stage of the tape retraction so that, after tensioning the tape, the termination of the tape retracting motion results in the tacho-alternator in combination with a known null-voltage detector producing a signal. This signal is used to switch the energy supply from driving motor 37 to driving motor 44.

Lateral guiding means 47 for tape 1 are provided between the two roller pairs 2, 3 and 4, 5. As can be inferred from FIG. 1, driving rollers 2, 4 are mounted with respect to the direction of tape motion so that rollers 2, 4 face the ends of lateral guiding means 47 and that the working driving roller pulls tape 1 away from lateral guiding means 47.

The machine with the above-described tape-driving means functions in the following fashion.

In the initial position of the machine which is preferably program controlled, a portion of plastic tape 1 is introduced into the space of the annular channel surrounding the package to be strung with string or tape; the plastic tape is pushed forward until a stop is reached. The tape section which forms the continuation of this portion runs along a straight-line path between rollers 2, 3 and 4, 5 of the two roller pairs and between lateral guiding means 47 and forms an integral part of stored tape. When the machine is put into operation, the free end, which bears against the stop, is kept fixed with the aid of a clamping device at the beginning of the program.

Thereafter, electromagnet 31 is energized whereupon push rod 32 transfers seesaw 6, 7, 8, via lever 33 and against the force exerted by compression spring 30, from the advance position shown in FIG. 1 to the retract position for tape retraction. In the latter position, driving roller 4 cooperates with counterpressure roller 5. After that, driving motor 37 having the higher rotation rate is switched on, and electromagnetic clutch 39 is brought into engagement. Driving motor 37 drives driving roller 4 via belt pulley 36, sleeve 38, electromagnetic clutch 39, swivel shaft 10, gears 22, 21, and shaft 20, and tape 1 clamped between driving roller 4 and counterpressure roller 5 is retracted (at the feed-in end) with a rather high velocity, in the direction of arrow 28 (FIG. 1). The tape section introduced into the annular channel leaves the same and surrounds the package situated in the space defined by the annular channel. The tape around the package is tensioned to the extent defined by the adjustable torque-limiting means of electromagnetic clutch 39, whereupon the halves of clutch 39 begin to slip. At the end of this pretensioning stage, the tape retracting motion must be suddenly stopped for tape 1, which in a single rapid motion encircles the package, not to cut the package or its wrapping material at the edges. To this end, the inertia of parts 10, 20, 21, and 22, which rotate during a fast retracting of the tape and are located between clutch 39 and driving roller 4, must be minimized. As soon as driving roller 4 and, hence, tacho-alternator 46, coupled to driving roller 4 via cog wheels 21, 22, swivel shaft 10, and belt pulley 45, have stopped rotating, a null-voltage detector produces a signal effecting the switchover of supply voltage from driving motor 37 with the higher rotation rate to driving motor 44 with the lower rotation rate. Driving motor 44, which drives driving roller 4 via chain sprocket 42, one-way clutch 43, swivel shaft 10, cog wheels 22, 21, and shaft 20, effects the ensuing tape retraction at a reduced rate. The energy supplied to driving motor 44 is preferably controlled with phase-shift control means, which facilitate adjustment of the final tension of the tape. When driving motor 44 is energized, time-delayed switching means (e.g., a time-lag relay) are put into operation, which allow adjustments of the time during which the final tension defined by driving motor 44 is applied, so that the final tension can be adapted to the particular type of package. In the case of hard packages, it suffices to have the final tension act for a short time. However, if the package is rather soft, or, more particularly, if the package is gradually deformed under the influence of the final tension (as in the case of textiles), the final tension must be permitted to act for an extended period of time in order to avoid that the tape tension decreases gradually at the strung or collared package.

When the application of the final tension is terminated, the feed-in end of the tape is kept fixed with the aid of a second clamping device, whereupon driving motor 44 is de-energized. Finally, the feed-in end of tape 1 is severed from the tape roll, and the overlapping tape ends are heat-sealed while they are not subjected to tension. Ultrasonic energy-generating means are preferably used for heat sealing the tape ends. At the end of this step, the clamping device is released so that the strung or collared package can be removed.

After that, a new portion of plastic tape is fed into the annular channel of the machine. To this end, electromagnet 31 is de-energized, so that seesaw 6, 7, 8 is returned into its initial position by spring 30, with driving roller 2 and counterpressure roller 3 cooperating in the initial position. Driving motor 37 with the higher rotation rate is then put into operation and drives driving roller 2 via belt pulley 36, cog wheel 34, 35, swivel shaft 9, cog wheels 19, 18, and shaft 17. Accordingly, tape 1 clamped between driving roller 2 and counterpressure roller 3 is fed at a relatively high rate in the direction of arrow 27 into the annular channel, until the free end of the tape engages a stop. Driving motor 37 is then de-energized. The machine is then ready for the next operation of tape application by stringing or collaring. Driving motor 37 can be stopped with the aid of a device which measures the length of the advanced tape section and disconnects driving motors 37, once a certain predetermined length of tape has been fed in.

The above-described tape-driving means has been shown to have numerous advantages over known devices of this kind. More particularly, considerable advantages are obtained by using a separate driving motor for generating the final tension in the final stage of tape retraction. On the one hand, the unrestricted driving operation makes it possible to obtain any desired length of the path over which tensioning is effected, i.e., a feature which is important in the case of large packages or of soft packages which yield gradually. Known devices, in which an additional clamping device is provided for the feed-in end of the tape, and which are operated with the aid of pneumatic or hydraulic driving means or with an excentric member performing a limited stroke, proved inadequate in the above respect, because the path over which post-tensioning is effected may be insufficient in the applications outlined above. On the other hand, when an electric motor is used to produce the final tension, the amount of final tension and the time interval in which the final tension is applied can be varied and adjusted in a simple fashion and at low cost.

What we claim is:

1. A tape drive means comprising:
   a pair of rollers consisting of a first driving roller and a first counterpressure roller for advancing the tape;
   a second driving roller and a second counterpressure roller for retracting the tape;
   a seesaw upon which the driving rollers of the two pairs of rollers are mounted, the two counterpressure rollers being fixed, the first driving roller in a first position of the seesaw cooperating with said first counterpressure roller, and the second driving roller in a second position of the seesaw cooperating with said second counterpressure roller;
   said seesaw being provided with two pivotal frames rotatable about corresponding swivel shafts and connected together by a guiding member and which carry, at a predetermined distance from the corresponding swivel shaft one driving roller each of the roller pairs;
   two alternatingly energized driving motors having different rates of rotation, the driving motor having the higher rate of rotation used for both advancing the tape and retracting the tape, and the driving motor having the lower rate of rotation being used for generating the final tension in the tape during the final stage of tape retraction;
   and wherein, when the respective driving roller is in its position of operation, each of the pivotable frames assumes a position such that each of the lines connecting the shafts of the driving rollers with the swivel shafts of the pivotable frames, and each of the lines connecting the shafts of the driving rollers with the shafts of the corresponding counterpressure roller include an acute angle with the line connecting the swivel shaft and the shaft of the corresponding counterpressure roller, whereby the reacting tensile force of the tape engaged by the active pair of rollers tends to rotate the corresponding pivotable frame by togglelever action.

2. The machine as defined in claim 1, wherein each of the driving rollers of the two roller pairs is fixed to a driven shaft which in turn is driven by said swivel shaft of the corresponding pivotable frame, via gear means mounted on the respective pivotable frame.

3. The machine as defined in claim 2, wherein the driving motor having the higher rate of rotation is clutch-connected to the swivel shaft driving the driving roller for advancing the tape and is connected to the swivel shaft driving the driving roller for tape retraction by means of an electromagnetic clutch with torque-limiting means, whereas the driving motor having the lower rate of rotation is connected to the swivel shaft driving the driving roller for tape retraction by means of a one-way clutch.

4. The machine as defined in claim 3, wherein, during the pre-tensioning stage, the driving roller for retracting the tape is connected to a tacho-alternator which, during the interruption of the tape-retracting motion after initially tensioning of the tape, generates an electric signal which triggers the switchover of the energy supply to the driving motor with the higher rate of rotation to the driving motor with the lower rate of rotation.

5. The machine as defined in claim 1, wherein a step motor is used as the driving motor having the higher rate of rotation.

6. The machine as defined in claim 1, wherein the inertia of the parts which rotate during the rapid retraction of the tape and which are located between the clutch and the driving roller is relatively small.

7. The machine as defined in claim 1, wherein lateral guiding means for the tape are provided between the two pairs of rollers and wherein the driving rollers are mounted, relative to the direction of tape motion, opposite the lateral guiding means, so that movement of either driving roller into operating position tends to push the tape away from the lateral guiding means.

8. The machine as defined in claim 1, wherein the time interval in which the final tension produced by the driving motor with the lower rate of rotation is effective can be adjusted.

* * * * *